Nov. 28, 1944.  G. C. JENKINS  2,363,732
AIR DRAG LANDING ANCHOR DEVICE FOR AIRCRAFT
Filed Aug. 20, 1942   2 Sheets-Sheet 1

Inventor
G. C. Jenkins

Nov. 28, 1944.  G. C. JENKINS  2,363,732
AIR DRAG LANDING ANCHOR DEVICE FOR AIRCRAFT
Filed Aug. 20, 1942  2 Sheets-Sheet 2

Inventor
G. C. Jenkins
By Glascock Downing Victor
Attys

Patented Nov. 28, 1944

2,363,732

UNITED STATES PATENT OFFICE 2,363,732

AIR DRAG LANDING ANCHOR DEVICE FOR AIRCRAFT

Graham Claude Jenkins, Port Elizabeth, Cape of Good Hope, Union of South Africa

Application August 20, 1942, Serial No. 455,486
In the Union of South Africa November 6, 1941

2 Claims. (Cl. 244—113)

This invention relates to an improved air drag landing anchor device for aircraft which is adapted to retard the landing speed and so enable an aeroplane on landing to come to rest in a shorter distance than heretofore. The ability to do this, besides permitting landing on relatively small aerodromes, is a safety factor when emergency or crash landings have to be made.

According to the invention an air drag landing anchor device for aircraft consists of a parachute device adapted to be housed in a chamber adjacent the tail of the machine with means operable from the pilot's cockpit or cabin for releasing said parachute device from its chamber when required so that it opens out behind the machine and acts as air braking means to reduce the flying speed thereof.

More particularly the chamber housing the parachute itself is adapted to open downwardly so that the parachute, on opening of said chamber, falls out by gravitational action clear of any part of the tail of the machine. The parachute is anchored to a suitable point adjacent the tail of the machine by means of a cable, with an interposed swivel connection to prevent twisting of the suspension cords thereof.

The opening of the chamber is adapted to be effected by a simple operation such as the movement of a conveniently placed hand lever alongside the pilot's seat. A draw-in rope or cable passing over winding means and attached adjacent the centre air release opening in the parachute, is provided for hauling in the parachute after use. It will be understood that the action of drawing in the parachute centre first, allows for rapid spilling of the air therefrom as soon as the plane has landed, and thereby prevents the machine from being blown backwards in the event of a landing being made in a strong wind.

To enable the invention to be more clearly understood and carried into practice, reference is now made to the accompanying drawings, in which like references denote like parts throughout the several views.

Figure 1:
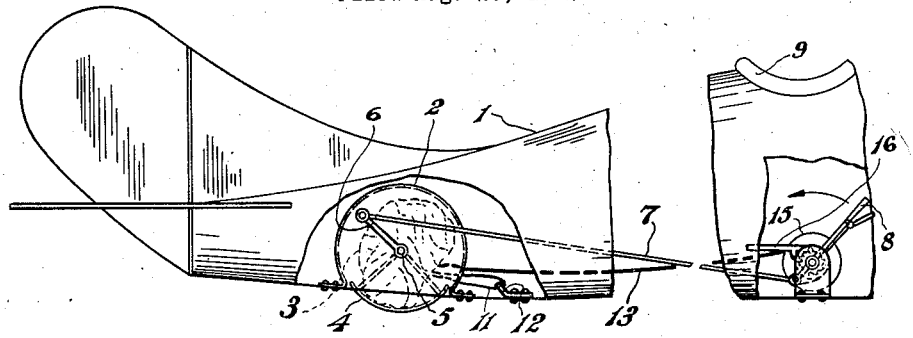
Fig. 1 is a shortened part-cut-away side elevation of the rear portion of an aeroplane fitted with apparatus constructed according to the invention and showing the parachute in its housed position.

Referring to the drawings, reference 1 denotes the rear portion of an aeroplane having a chamber 2, for housing a parachute 3, located towards the tail end of the machine. The chamber 2 is in the form of a cylindrical container having an opening in its bottom side adapted to be closed by an arcuate door 4 mounted for partial rotary movement on pintles 5 journalled in the end walls of the casing of the container 2. The said door 4 is arranged to be opened by means of a lever arm 6 keyed to one of the pintle pins 5 and connected by a link rod 7 to an operating hand lever 8 located in the cockpit 9.

The parachute 3 which is substantially of conventional design, is connected through a swivel connection 10 to an anchoring cable 11 passing through an anchor shackle 12, securely fixed to the fuselage. A draw-in cable 13 attached adjacent the centre air release opening 14, has its opposite end secured to a small reeling drum 15, likewise located in the cockpit 9. This cable 13 passes through a central bore in the swivel connection 10. The winding drum 15 is provided with a ratchet stop lever 16 co-acting with a ratchet wheel 17, to facilitate the reeling in operation.

Figure 4:
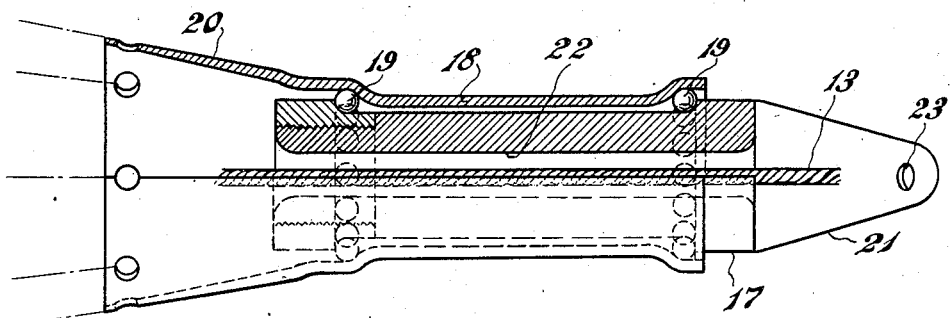
Fig. 4 is a part-sectional elevation of the swivel connection for the parachute.
Figure 5:
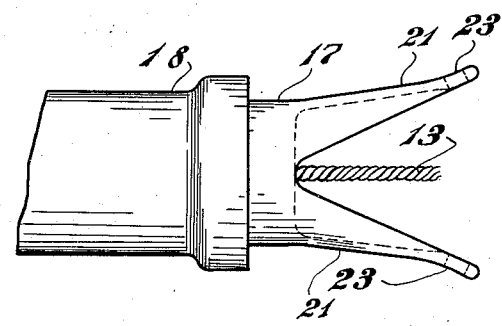
Fig. 5 is a fragmentary plan view of the front end of the swivel connection shown in Fig. 4.

Figs. 4 and 5 illustrate in more detail the swivel connection 10 which consists of an inner or front part 17, rotatably mounted by the ball races 19 within an outer or rear part 18 having a holed flared skirt portion 20 to which the parachute cords are attached. The inner part 17 is provided with a central bore 22 through which the draw-in cable 13 passes, while its front end is bifurcated and the two arms 21 provided with holes 23 for the attachment thereto of the anchoring cable 11.

Figure 2:
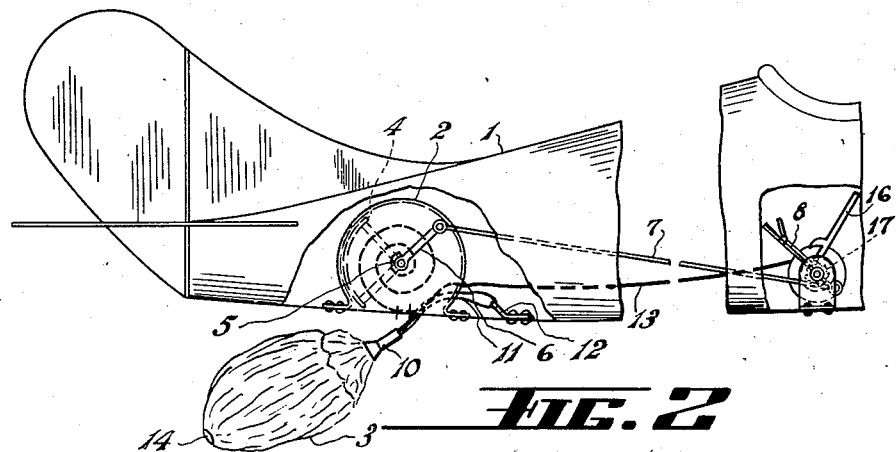
Fig. 2 is a similar view to that of Fig. 1, but showing the parachute a moment after its release.
Figure 3:
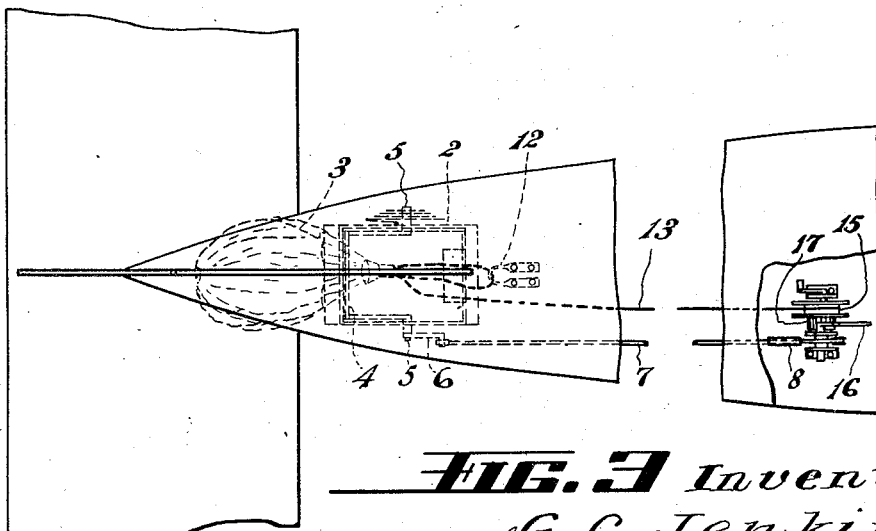
Fig. 3 is a plan view taken on Fig. 2.
Figure 6:
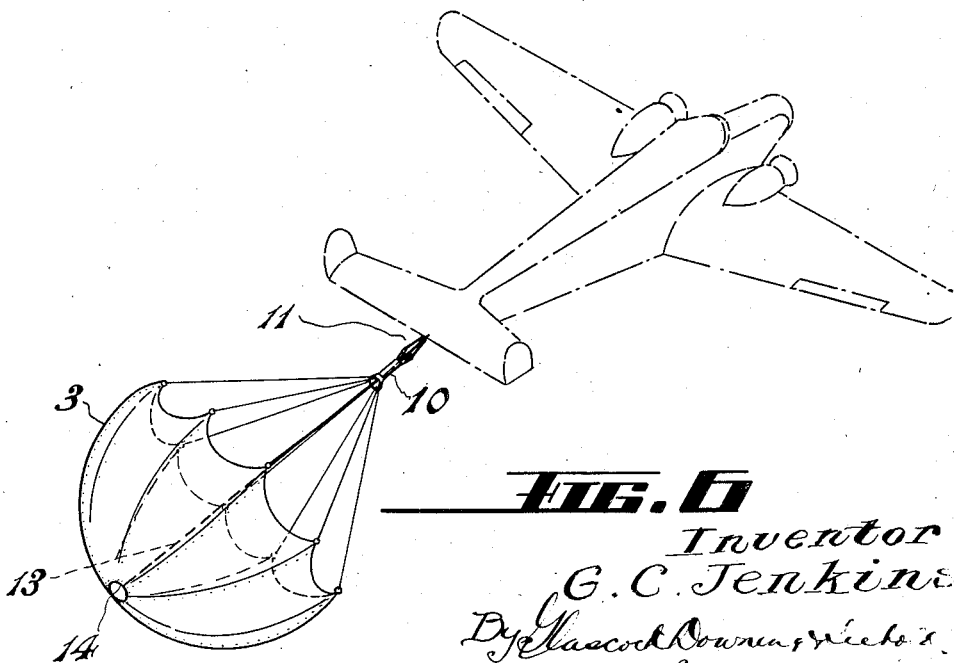
Fig. 6 is a perspective view showing the relationship of the parachute to an aeroplane, when in the fully open position.

In operation the several parts of the apparatus will normally be in the positions shown by Fig. 1. When the pilot desires to release the parachute 3, he moves the stop lever 16 and the hand lever 8 to the positions shown in Fig. 2. These motions allow the folded parachute 3 to drop out below the tail of the machine, by opening the door 4 and allowing the draw-in cable 13 to be freely reeled off the drum 15. Immediately after release the parachute opens and trails out behind the machine to act as an air brake, as clearly shown in Fig. 6.

When, after landing, it is desired to re-house the parachute, the winding drum 15 is rotated to haul in the cable 13. This has the effect of turning the parachute inside out so as to spill the air therefrom and enable it to be folded and replaced in the container 2 ready for re-use.

If considered advisable, more than one parachute device may be fitted to a machine.

What I claim is:

1. A motion retarding device for aircraft comprising a cylindrical container located adjacent the tail of the aircraft and having an opening in the underside thereof, an arcuate door for closing said opening and mounted for rotation about the axis of the cylindrical container, a parachute attached to the aircraft and normally enclosed in said container and supported by said door whereby when said door is opened the parachute may descend by gravity, an operating lever pivotally mounted in the aircraft and connected with said door.

2. A motion retarding device as claimed in claim 1, characterized by the provision of a draw-in cable connected with said parachute, and a winding drum for said cable rotatably mounted coaxially of said lever.

GRAHAM CLAUDE JENKINS.